Nov. 7, 1933.  A. F. HICKMAN  1,934,670
VEHICLE SPRING SUSPENSION
Filed Feb. 25, 1932  9 Sheets-Sheet 2
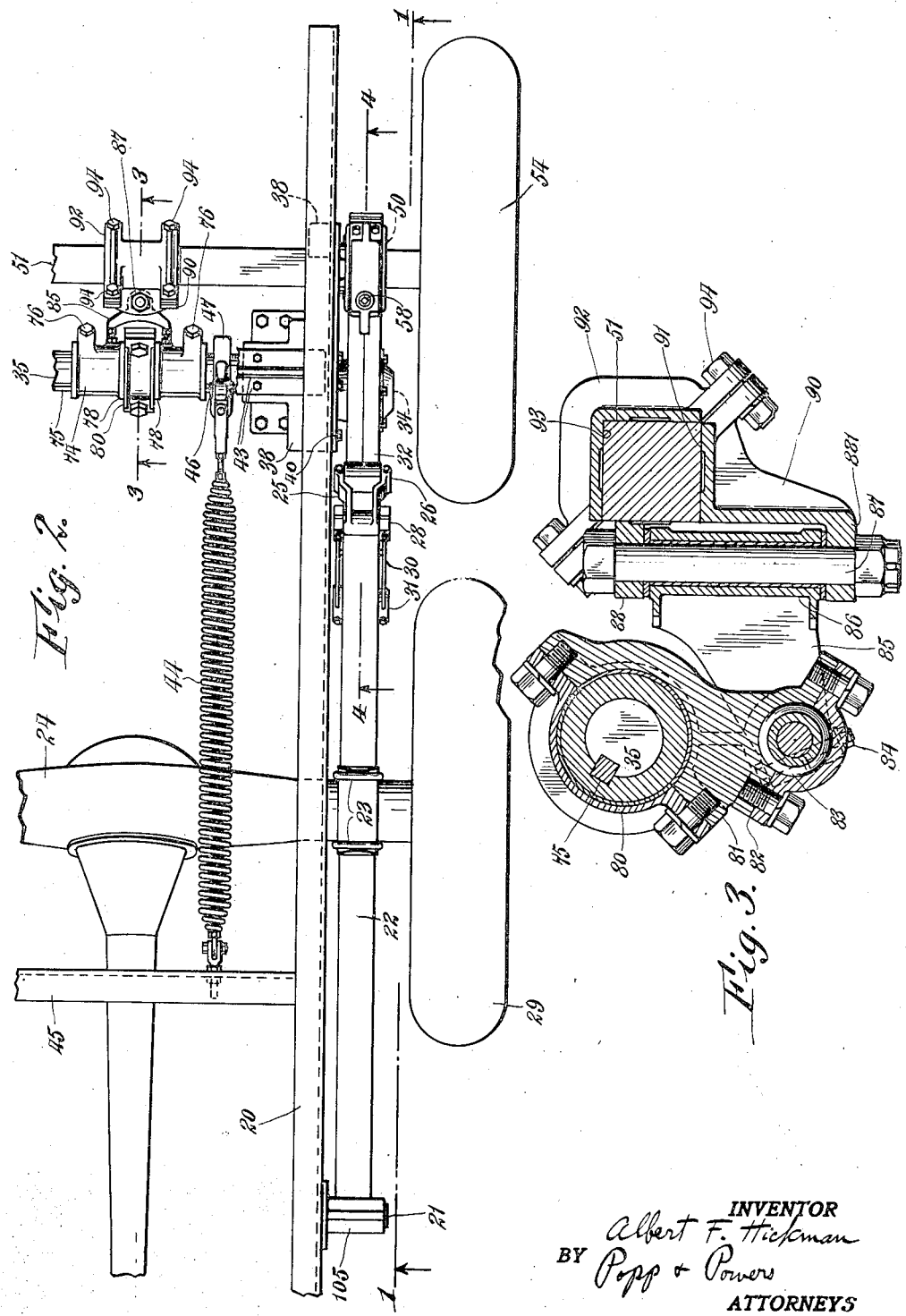

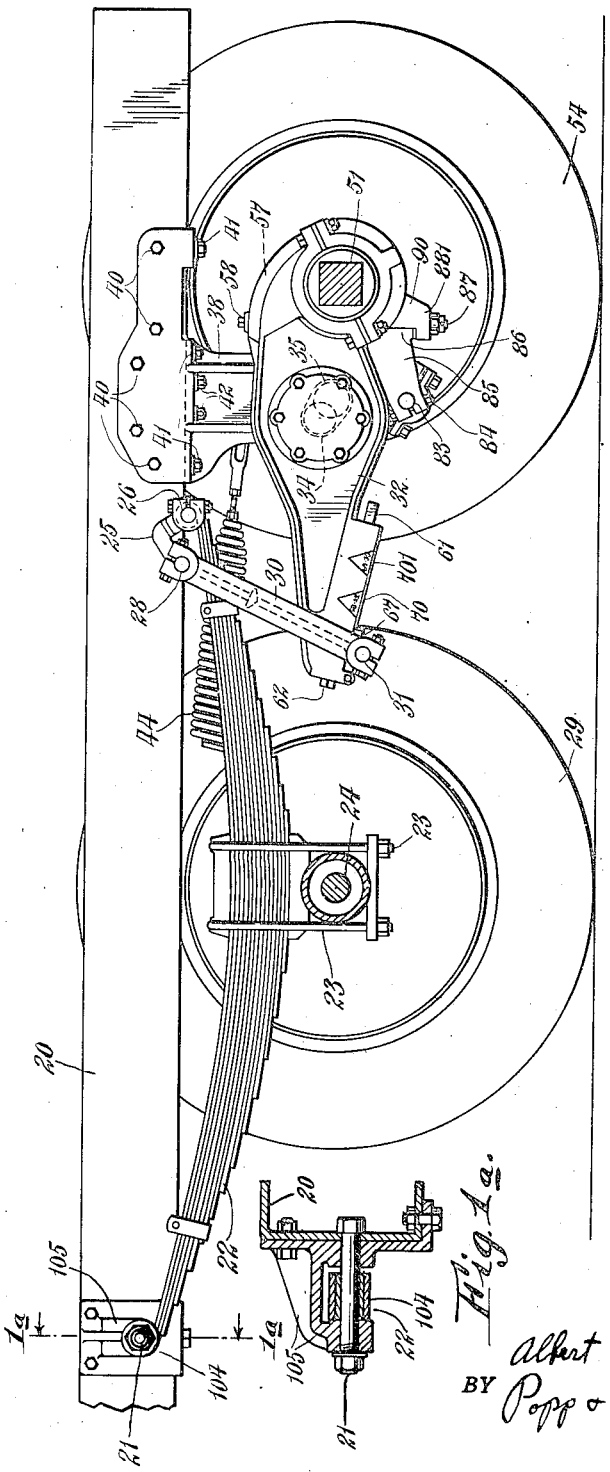

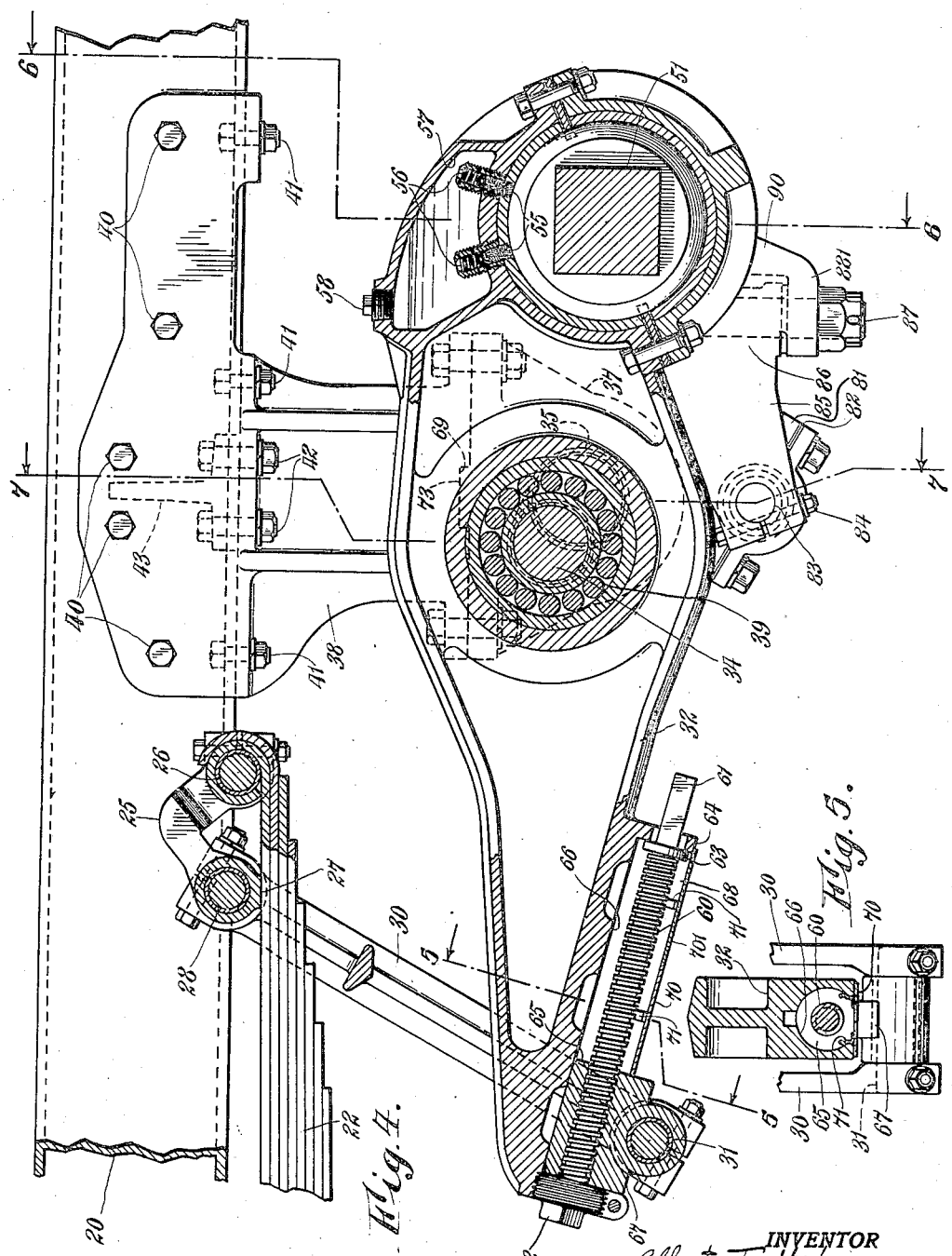

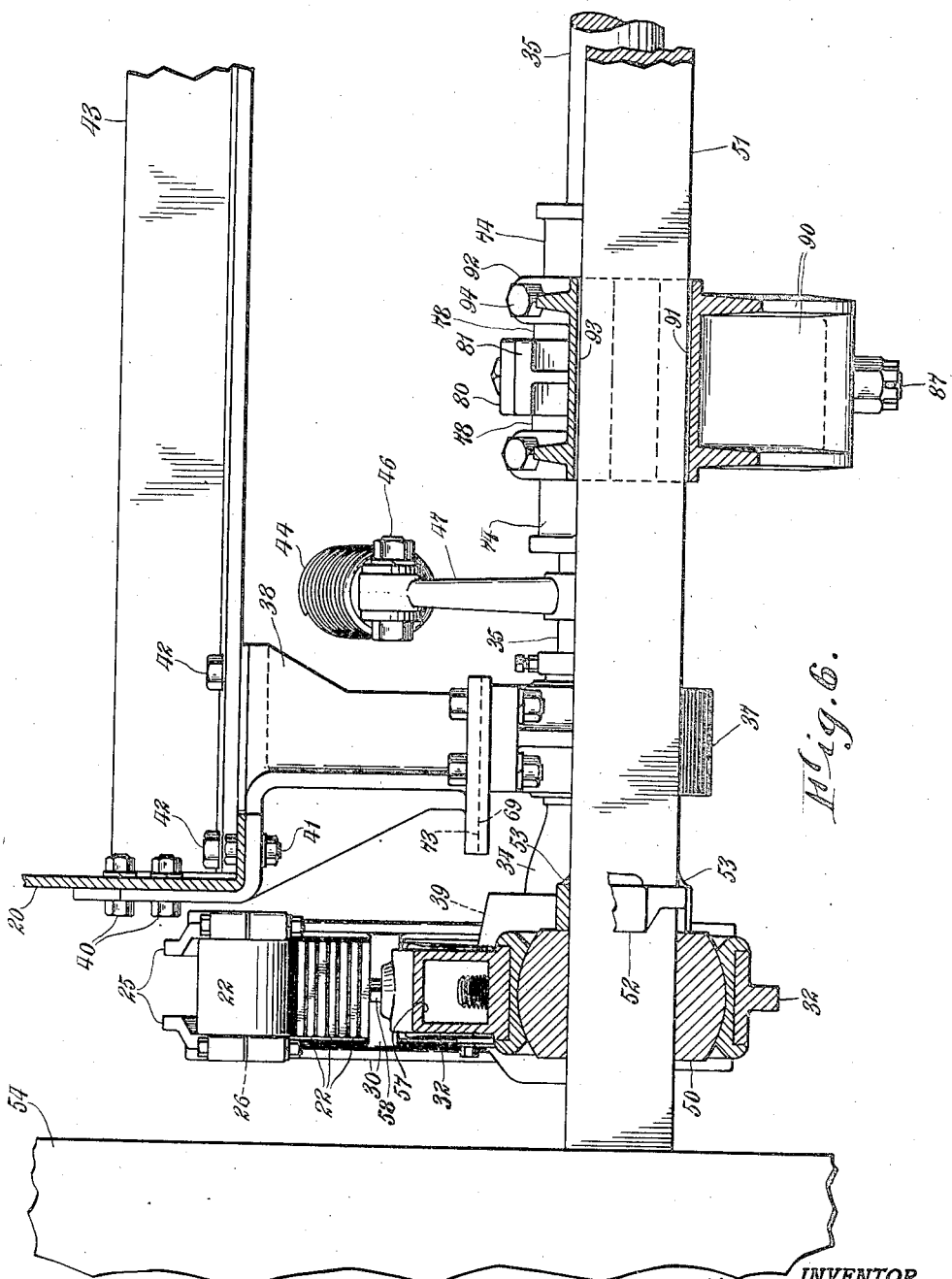

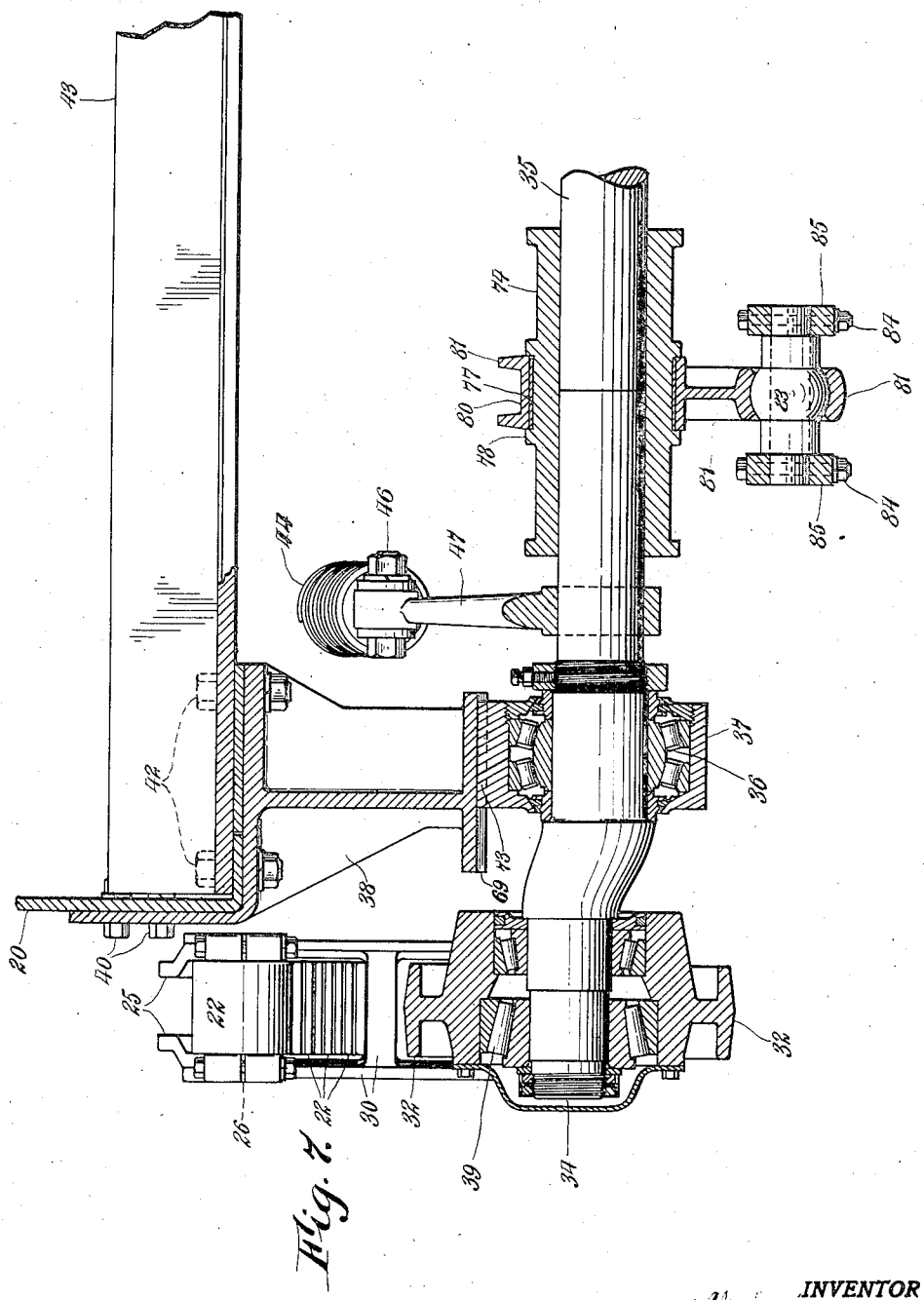

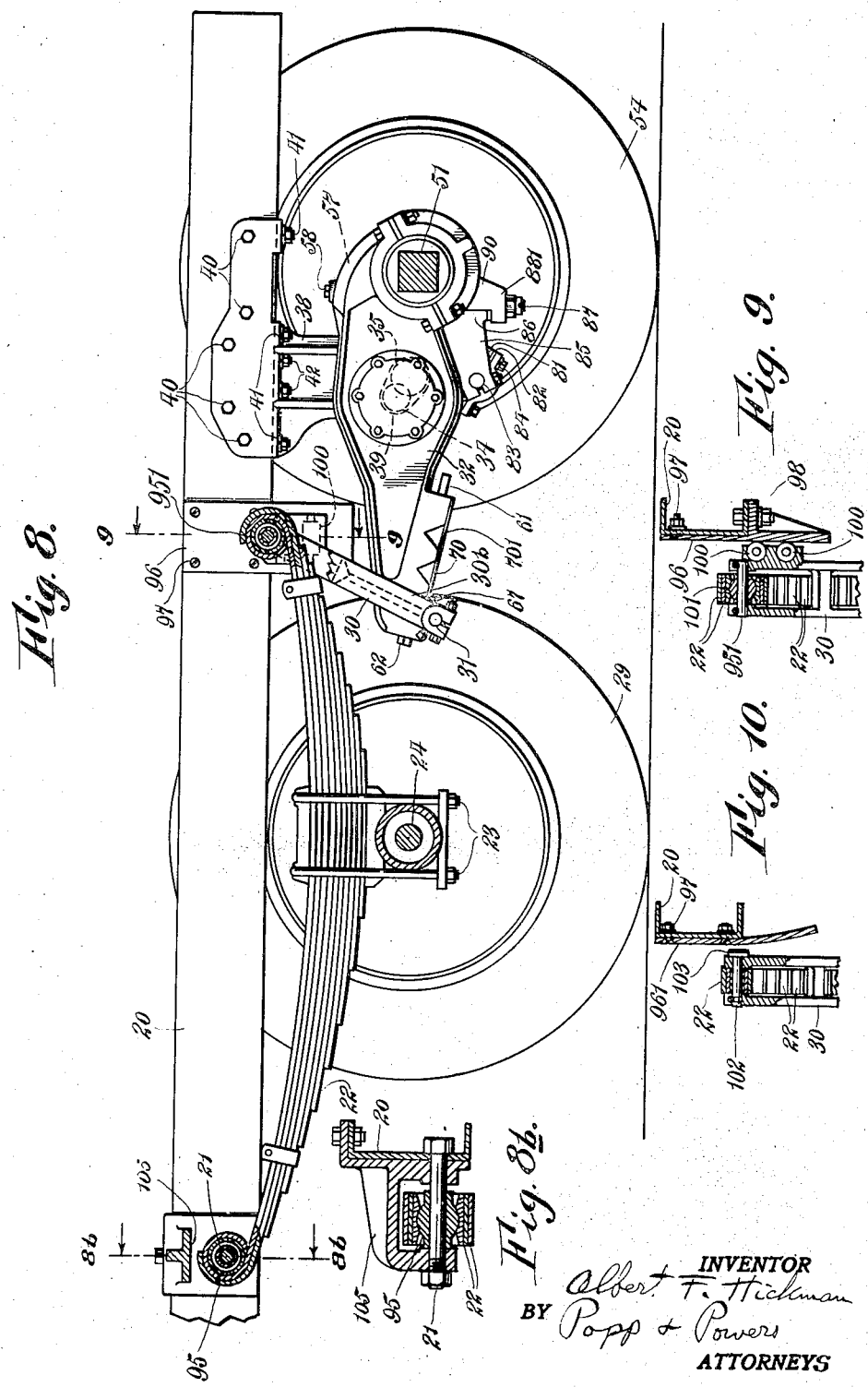

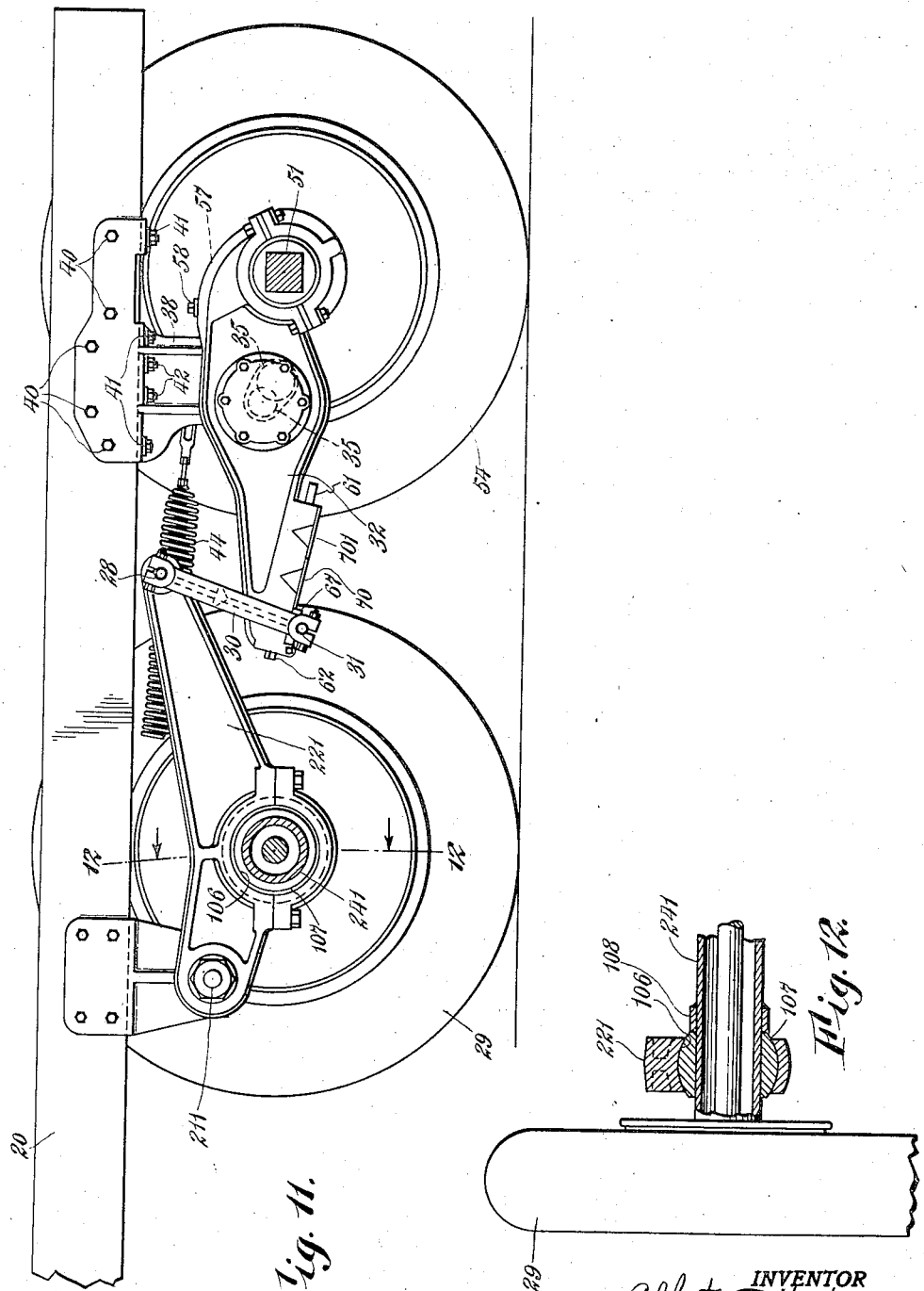

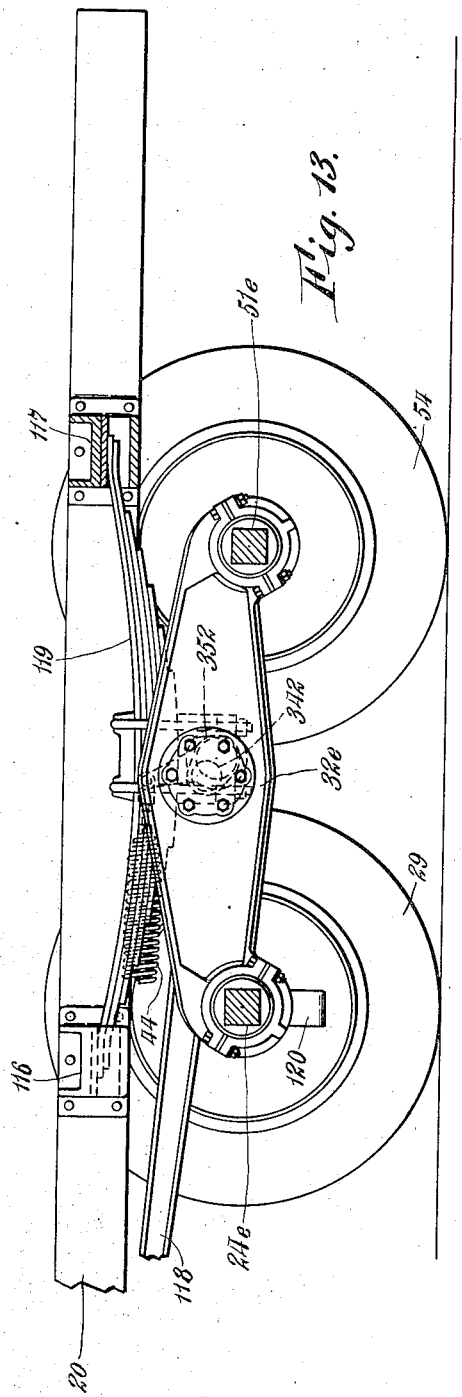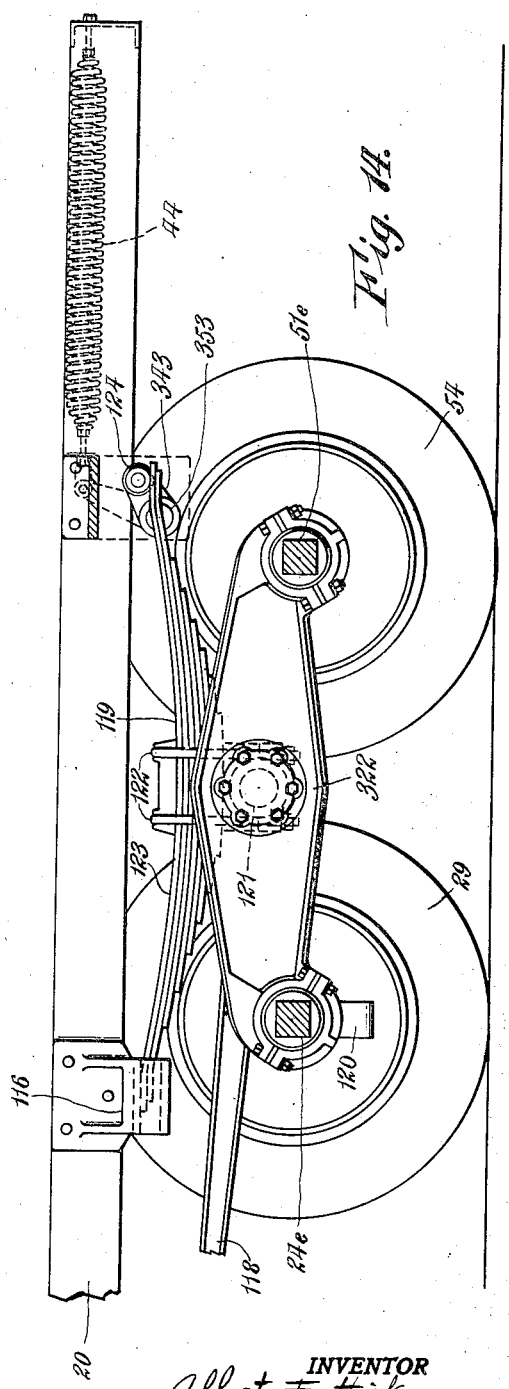

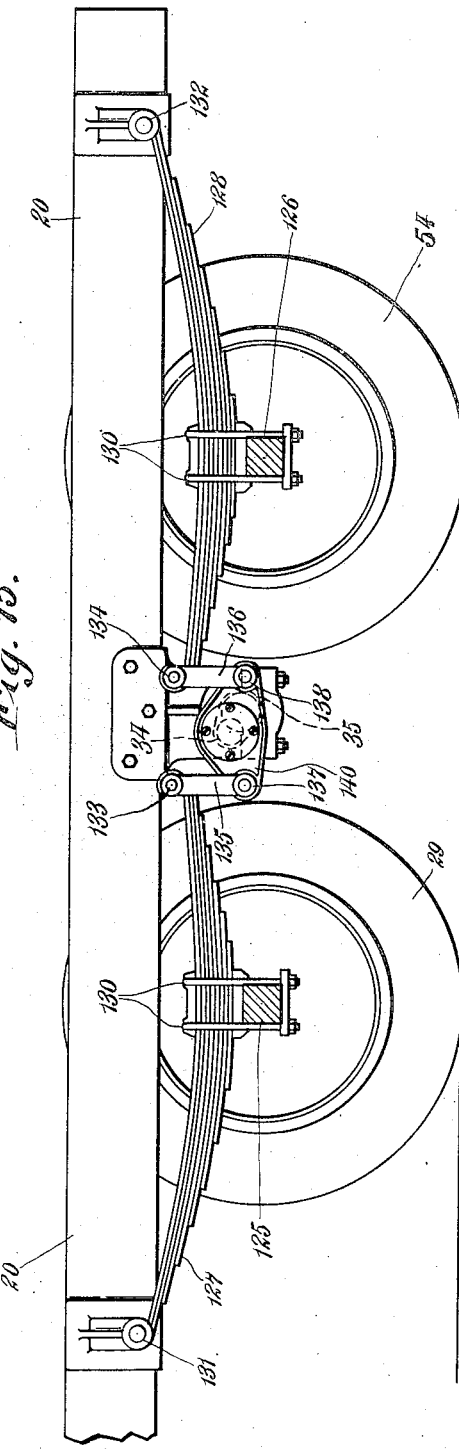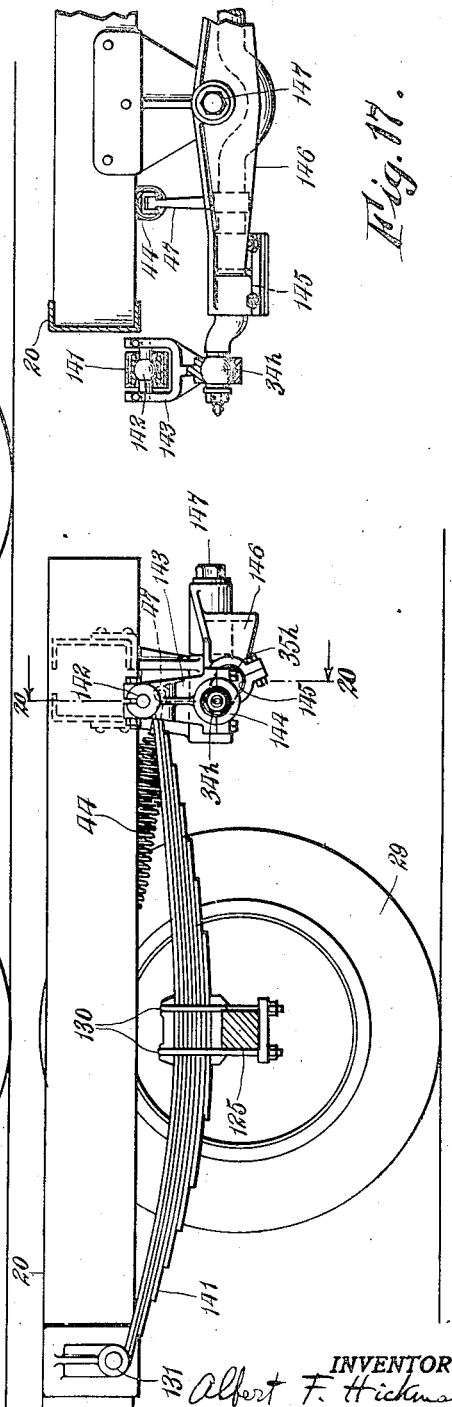

Patented Nov. 7, 1933

1,934,670

UNITED STATES PATENT OFFICE 1,934,670

VEHICLE SPRING SUSPENSION

Albert F. Hickman, Eden, N. Y., assignor to Hickman Pneumatic Seat Company, Inc., Eden, N. Y., a corporation of New York Application February 25, 1932. Serial No. 595,973

24 Claims. (Cl. 280—104)

This invention relates to a "non bottoming" vehicle spring suspension, i. e., to a means of softly cushioning small increments of either upward or downward axle pressures imposed upon the main frame of the vehicle and then gradually increasing the resistance to axle movement as the increments of pressure became increasingly greater in amount, thereby rendering any sudden stoppage of wheel movement absolutely impossible, irrespective of the total amount of the imposed pressure.

This invention concomitantly relates to a spring suspension in which the approximately vertical and variable thrust of each wheel axle is transformed into an approximately horizontal force thereby enabling the variable axle pressures to be resisted by the inertia or the momentum of the vehicle as the case may be.

The invention relates more particularly to that type of spring suspension for three axle vehicles which employs, on each side of the vehicle, a single main spring for cushioning the very heavy movements of both the driving and the third axle.

The principal object of the invention is to permit either or both of the rear axles to move vertically (when the vehicle is travelling over a moderately rough road) without appreciably altering the vertical distance of the frame from the road and, at the same time, without flexing the relatively stiff main springs. Another object of the invention is to provide relatively short stiff main springs so as to almost entirely eliminate side sway and, at the time to obtain (by the use of one or more secondary springs) such riding qualities as would ordinarily require very long and soft main springs.

A further object of the invention is to provide a spring suspension having not only the foregoing characteristics but also capable of being easily adjusted to provide different load ratios between the driving and the third axle.

A still further object of the invention is to employ certain parts of the construction for both the resisting of brake torque on the third axle, and also for other or primary functions.

An additional object of the invention is to ensure that all of the rear vehicle wheels freely and accurately track each other even though the bearings, which accomplish this result, are relatively small and have become considerably worn.

Numerous other objects of the invention and practical solutions thereof are disclosed in detail in the herein patent specification wherein:

In the accompanying drawings:

Figure 1 is a vertical longitudinal section of the rear end of a three axle truck taken on line 1—1 Fig. 2.

Figure 1a is an enlarged fragmentary, vertical transverse section through the front end of the main spring and associated parts, taken on line 1a—1a Fig. 1.

Figure 2 is a fragmentary top plan thereof.

Figure 3 is an enlarged, vertical longitudinal section through the parts which resist brake torque of the third axle, taken on line 3—3 Fig. 1.

Figure 4 is a fragmentary, enlarged, vertical, longitudinal section of the rear end of the vehicle showing the equalizing member and associated parts, taken on line 4—4 Fig. 2.

Figure 5 is an enlarged, substantially vertical, transverse section through said equalizing member taken on line 5—5 Fig. 4.

Figures 6 and 7 are fragmentary, enlarged, vertical, transverse sections of the rear end of the vehicle taken on correspondingly numbered lines of Fig. 4.

Figure 8 is a vertical longitudinal section of the rear end of a modified form of the three axle truck similar to that shown in Fig. 1.

Figure 8b is an enlarged fragmentary, vertical, transverse section through the front end of the type of main spring shown in Fig. 8, taken on line 8b—8b Fig. 8.

Figure 9 is a fragmentary, vertical, transverse section thereof taken on line 9—9 Fig. 8.

Figure 10 is a fragmentary, vertical, transverse section similar to Fig. 9 but showing a modified means of limiting lateral movement of the rear ends of the main springs.

Figure 11 is a vertical, longitudinal section of the rear end of another modified form of three axle truck in which the main springs are entirely dispensed with.

Figure 12 is a fragmentary, vertical, transverse section thereof through the driving axle and associated parts, taken on line 12—12 Fig. 11.

Figures 13 and 14 are vertical, longitudinal sections through the rear ends of still further modified forms of three axle trucks showing the three-axle spring suspensions in which the driving and the third axle are mounted at opposite ends of an equalizing member which is centrally fulcrumed.

Figure 15 is a vertical longitudinal section of the rear end of yet another modified form of three axle spring suspension.

Figure 16 is a vertical longitudinal section of the rear end of yet another modified form of two axle spring suspension.

Figure 17 is a fragmentary vertical, transverse section thereof taken on line 17—17 Fig. 19.

This application is a continuation in part of my invention entitled "Vehicle spring and shock absorber suspension" Serial No. 497,653 filed November 24, 1930, now Patent No. 1,892,305, dated Dec. 27, 1932.

My invention may be embodied in various forms and in vehicle spring suspensions of different constructions, and the present applications are therefore to be regarded merely as a few of the organizations which satisfactorily carry out the invention in practice. As here shown the same are constructed as follows:—

The construction of Figs. 1–7

To the side rail or frame bar 20 of the main frame of the vehicle is pivoted at 21 the front end of the usual semi-elliptic leaf spring 22, the particular spring illustrated being located at the left, rear end of the vehicle, it being understood that a similar spring with similar associated parts is arranged on the right rear end of the vehicle and also that the front end of the vehicle (not shown) is resiliently supported by a suitable front axle and a pair of steering wheels which are preferably arranged in the manner indicated in aforesaid patent application Serial No. 497,653.

Secured by U bolts 23 to the central part of said leaf spring 22 is the usual driving axle 24 and driving wheels 29, this arrangement constituting a so called Hotchkiss drive whereby both the horizontal drive thrusts and also the braking thrusts of said driving axle are taken care of by said semi-elliptic spring 22 and its fixed front pivot 21.

Where the present invention is applied to an already existing construction, it is desirable to both reduce the effective overall length of the regular semi-elliptic spring 22 (to reduce the distance between the driving and third axle wheels) and, at the same time, to stiffen said spring (to reduce side sway) without requiring the adding of supplemental spring leaves. This result is accomplished by a spacer arm 25 which is pivoted at 26 to the rear end of the main spring 22 and extends longitudinally forwardly therefrom and rests (see Fig. 4) with its abutment 27 upon the rear upper face of said main leaf spring 22.

Pivoted at 28 to the front end of said spacer arm 25 is a depending link or shackle 30 which is preferably bifurcated at its upper and lower ends as shown. It is to be understood that in a standardized vehicle, this shackle 30 will be directly pivoted to the rear spring eye 26 of the main spring 22 (in the manner of Fig. 8) inasmuch as, in such a construction, the length and resilience of said main spring will be designed particularly for the most efficient cooperation with the rest of the parts which together constitute the herein invention, no spacer dog 25 being in such case required.

Said shackle 30 is pivoted at its lower end at 31 to the front end of a walking beam or equalizing lever or member 32. The central part of this equalizing member is fulcrumed by a tapered roller bearing 39 upon the crank arm 34 of a crank shaft 35 (see Figs. 7, 4, 1 and 2). The latter is journaled at its opposite ends in a pair of self aligning roller bearings 36 disposed at the adjacent opposite sides of the automobile and each of said bearings is arranged within a housing 37 which is secured to the lower face of a companion bracket 38. The latter is secured by suitable bolts 40, 41 and 42 to its companion chassis side frame bar 20, the bolts 42 being additionally used (see Figs. 7 and 4) to secure a T iron cross brace 43 to said chassis side frame bars 20, thereby stiffening the whole rear end of the vehicle frame. These self aligning bearings 36 permit of quickly assembling and installing the herein spring suspension without requiring extreme accuracy in the alignment of said bearing housings 37 as would otherwise be the case. To the slight extent which may occur in actual practice these self-aligning bearings 36 are also capable of acting in the capacity of ball and socket joints, whereby binding of the bearings is prevented when the vehicle frame weaves to a very moderate extent when passing over very rough roads at high speeds.

It will be noticed that, when the vehicle is at rest and fully loaded, the crank arm 34 is positioned obliquely above and forwardly of the main axis of the crank shaft 35. By reason of this arrangement the fulcrum 34 of the equalizing member 32 is enabled to move in an arc upwardly and rearwardly when the wheel 29 hits an obstruction and is thereby subjected to an oblique pressure which is greater than the normal static pressure, shown in the drawings.

The crankshaft 35 is resiliently restrained from rotating in a clockwise direction about its axis (as viewed from the position of Figs. 1 and 4) by a helical secondary spring 44, the front end of which is adjustably pivoted to a cross brake or transverse frame member 45, while its rear end is pivoted at 46 to the upper end of an upstanding lever 47, the lower part or hub of which embraces and is keyed or otherwise secured to aforesaid crank shaft 35. This secondary spring 44 is thus adapted to resiliently restrain both upward and backward movement of the crank arm 34, which constitutes the fulcrum of the equalizing member 32. Due to the sinusoidal shortening of the effective lever arm between the crank arm 34 and the axis of the crank shaft 35 the effective strength of said secondary spring 44 is also of a sinusoidal character. This characteristic of the invention is colloquially and expressively known as "nonbottoming".

Said secondary spring 44 is also capable of resiliently and sinusoidally resisting downward movement of said crank arm 34, thereby softening the downward as well as the upward (and obliquely rearward) movement of said crank arm, the resilient resistance in each case being of a sinusoidal character.

Secured gyratorially by ball and socket joints (see Figs. 6, 4 and 1) to the rear end of the equalizing members 32 is a third axle 51 which is preferably of square or other rectangular cross section. Any outward movement of said third axle 51 is limited (beyond the neutral position shown in the drawings) by a pair of stop collars 52 which are welded at 53 to said axle and normally bear against the inner face of the male or ball portion 50 of each of said ball and socket joints. Each of said ball portions 50 is slidably journaled on said third axle 51. Thus each end of said third axle 51 is free to move upwardly relatively to its companion ball portion 50 and to its companion equalizing member 32. Hence, when one end of said third axle 51 moves either up or down from the position shown in the drawing relatively to the other end of said third axle, the opposite end of said third axle 51 is free to slide inwardly without laterally distorting the equalizing member 32. By this construction either one or both of the ends of said third axle may rise or fall without any possibility of creating a binding between said third axle and the equalizing members 32 which carry the load imposed by said third axle.

Each of the ball members 50 of the third axle ball and socket joints is lubricated by a pair of cylindrical felt wipers 55 (see Figs. 4 and 6) which are depressed by companion compression springs 56, the oil being supplied to said felt wipers from a cored oil reservoir 57 replenished every 25,000 miles or so through a tapered plug or filling cap 58.

At opposite ends of said third axle 51 are suitably journaled a pair of supplementary, rear or third axle ground wheels 54 which in the particular construction shown in the drawings are not power driven but act to supplementarily support the load and thereby reduce the unit pressure upon the pavement over which the vehicle travels.

It is obvious that maximum traction (which is desirable) of the vehicle is obtained by having the maximum amount of pressure upon the driving wheels 29. On the other hand however, a minimum pressure per unit of area of roadway (which is also desirable) is obtained by having an equal pressure on all of the vehicle wheels. Under different conditions of road, load etc. it is sometimes the one and sometimes the other condition which is the more desirable, and the present invention provides for the convenient changing of the load ratio of the driving and third axle so as to obtain a sufficiently low unit road load for any given kind and amount of loading and, at the same time, a sufficient pressure on the driving wheels 29 to ensure adequate traction under the particular road conditions to be encountered. Such a variability of change in ratio between the drive and third axle loading is obtained by varying the position of the pivot 31 relatively to the crank arm 34 (see Figs. 4, 5 and 1).

Arranged in the lower front end of each equalizing member 32 is a ratio adjusting screw 60 whose rear end 61 is preferably of rectangular cross section to permit of easily turning the same by a socket wrench or otherwise. Forward longitudinal displacement of said adjusting screw is prevented by an externally screw threaded plug or head 62 which is threaded into said equalizing member and bears against the front end of said screw. Rearward longitudinal displacement of said screw is prevented by a thrust collar 63 which is integral with said screw or bears against the front face of an end wall 64 extending downwardly from said equalizing member and loosely receiving the shank of said adjusting screw.

Engaging with the threads of said adjusting screw is a nut or internally threaded sliding head 65, the upper part of which is of cylindrical form (concentric with said adjusting screw 60), this cylindrical periphery being longitudinally and slidably received within a cylindrical bore 66 formed in the equalizing member 32 concentrically with said adjusting screw 60. Extending downwardly from the main cylindrical body of said sliding head 65 is a neck 67. The latter is somewhat narrower than the throat 68 of its companion equalizing member 32 through which it projects, thereby permitting said sliding head 65 to rock slightly about its axis, (this axis being likewise the axis of the cylindrical bore 66). At the lower end of said neck 67 is pivoted, at 31, the lower end of the shackle 30 as hereinbefore described.

For ordinary commercial practice, it is desirable that the distance between said pivot 31 relatively to the crank arm 34 be adjustable to provide only three distinct, adjustment positions or driving third axle load ratios, namely: 50—50; 58—42 and 65—35, the first numeral in each ratio indicating the proportion of the rear vehicle load borne by the driving axle 24. The minimum unit load upon the roadbed is obtained by the use of the 50—50 setting in which case the driving axle 24 and the third axle 51 support an equal portion of the rear end weight of the vehicle, while the 65—35 ratio provides the driving wheels 29 with maximum traction by imposing 65 percent of the rear-end weight of the vehicle upon the driving axle 24. The 58—42 ratio represents a rear end ratio loading which is intermediate of these extremes. These three load-ratio positions are preferably indicated by suitable markings on the equalizing member 32, as shown in Fig. 1.

To enable grease or other lubricant to be properly retained in between each sliding head 65 and the cylindrical bore 66 of its companion equalizing member 32, and also to exclude dust and grit from this portion of the spring suspension, a pair of suitable dust plates 70, 701 are provided, the same being adapted to cover over the lower end of the throat 68 and to be held in place by spring fingers 71 which bear against opposite sides of said throat and curl outwardly and downwardly against the cylindrical surface of the bore 66 of their companion equalizing member. When the adjusting screw 60 is to be turned so as to move the sliding head 65 to either one of its two other positions, these dust plates 70, 701 are first removed and then said screw suitably turned to move the sliding head 65 to its desired position, after which said dust plates 70, 701 are snapped into position to cover over the otherwise exposed portion of the longitudinal throat 68 of their companion equalizing member 32.

The construction shown in the drawings is such as to enable the same to be applied as an attachment to vehicles of different dimensions. For instance, the variable distance in different vehicles between the main spring 22 and the adjacent chassis frame bar 20 is compensated for by laterally sliding the self aligning bearing housings 37 upon their companion brackets 38 until the proper location is obtained, after which the same are suitably drilled, reamed and bolted together. To enable each of said housings 37 to be moved to its correct lateral position (prior to the bolting in place) without the liability of either being twisted out of place or of being incorrectly placed longitudinally, each of the housings 37 is provided with a horizontal transverse guide rib 73 which is snugly received within a groove 69 of similar cross section formed horizontally and transversely in the lower face of its companion bracket 38.

Variation in the distance between the self aligning bearings 36 is compensated for by constructing the crank shaft 35 of a pair of crank shaft sections, the abutting inner ends of which are suitably machined to provide the proper dimensional distance and are rigidly clamped together by an end split collar 74 which is suitably keyed by a key 75 to both of said crank shaft sections and is clamped tightly thereon by draw bolts 76.

This end split collar 74 and also the crank shaft 35 both perform functions other than those hereinbefore mentioned, being additionally used to prevent turning of the third axle 51 when the brakes are applied to the third axle wheels 54. This is accomplished as follows: The central part of the collar 74 (see Figs. 7, 3 and 2) is turned down to form a bearing 77 which is bounded on its opposite ends by annular flanges 78. Arranged between said flanges and embracing said bearing 77 is the split hub 80 of a torque arm 81. The lower end of said torque arm is split at 82 and is spherically hollowed out or machined to receive a ball 83 which is secured by clamp bolts 84 to the front bifurcated end of a swinging bracket 85. This constitutes a ball and socket joint between said torque arm 81 and said swinging bracket 85. The latter at its rear end is provided with a vertically elongated hub 86 which oscillatorily receives a vertical pivot pin 87. This pin passes through the upper and lower ears 88, 881 of a clamp arm 90 provided with a V notch 91 which receives one side of the rectangular third axle 51 and is suitably secured thereto by a clamping cap 92 having a V notch 93 and clamped in place by clamp bolts 94. This pair of V notches 91 and 93 permits the clamp arm 90 to be very rigidly clamped to said third axle 51 without requiring any accurate machine work to accomplish this end. By this connection between said third axle 51 and said crank shaft, either one or both ends of said third axle 51 is free to swing up or down relatively to said crank shaft 35 and, at the same time said third axle is restrained against rotation when the brakes are applied to its third axle wheels 54.

It has been hereinbefore assumed that the pivot 21 at the front end of the main spring 22 is a plain pivot, i. e., one which permits the main spring to swing vertically about said pivot but is restrained against movement parallel to its axis. In actual commercial installations such a plain pivot 21 has given satisfaction but attention is now directed to Fig. 1a which shows an improved form of pivotal connection. In this Fig. 1a it will be noticed that, in the normal position of the main spring 22 illustrated, the outer face of the front eye 104 of said main spring bears against the adjacent vertical face of the bifurcated bracket 105, while a clearance space exists between the inner vertical face of said spring eye 104 and the adjacent vertical face of said bracket 105. By reason of this construction, when the one end of the driving axle 24 is raised or lowered relatively to the other end of said axle, the front end of the companion main spring 22 is free to move inwardly thereby preventing the setting up of transverse strains in said main spring. Such strains are much more harmful (to the chassis as a whole) than plain vertical flexures or twistings of the main springs, because said main springs have very little resilience and very much strength transversely, so that, the normal consequence of such a construction is that the main frame of the vehicle is distorted by these forces wherever these forces come into play. Obviously this is not desirable and hence the construction shown in detail in Fig. 1a is preferred in which the main spring 22 is subjected only to flexing or twisting stresses but not to lateral flexures.

The aforedescribed construction (Figs. 1–7) has the following features:—

1. When the vehicle is passing over a moderately rough road either or both the driving axle 24 and third axle 51 may be moved up or down without affecting the position of the main frame of the chassis and without flexing the main springs 22.

2. Because of the soft cushioning of the vehicle spring suspension due to the secondary spring 44, the main springs may be made sufficiently stiff to almost entirely reduce side sway, without sacrificing soft riding quality.

3. An increase in load on the driving axle 29 automatically prevents the body from tending to drop by the increasing of the downward thrust on the third axle 51, or vice versa.

4. All lateral movement of all of the wheels is strongly and positively prevented, the driving axle by reason of its sturdy connection with the main spring 22, and the third axle by reason of the fact that the equalizing members 32 are constrained to remain in one vertical, longitudinal plane while all tilting of the third axle is taken care of by the ball and socket joints 50.

5. The slipping of the third axle within said ball and socket joints 50 enables either end of said third axle to rise or fall without causing any binding action, and, at the same time, said third axle is restrained against undue movement parallel to its axis by the stop collars 52.

6. Variation in the load ratio of the driving and third wheel axles is easily obtained.

7. All side sway tendency is confined to the main springs, the crank shaft 35 permitting a soft "nonbottoming" action without contributing to the side sway tendency (see my Vehicle spring suspension patent application Serial No. 497,653 filed Nov. 24, 1930).

8. When the rear end of one main spring 22 moves vertically relatively to the rear end of its companion main spring, there is a lateral movement of said rear ends of said main springs, but all binding of the link connections is prevented by the ball and socket nature of the connection between each shackle 30 and the front end of its companion equalizing member 32.

9. The method of lubricating the ball and socket joints 50 is very effective after these parts have been used a sufficient length of time to smoothly seat themselves.

10. Brake torque of the third axle is taken care of in a simple manner, using, for this purpose, the end split collar 74 and the crank shaft 35, which have primary operating functions in addition to this collateral use as restrainers of third axle brake torque.

11. The vertical pressures exerted upon the main vehicle frame by this improved spring suspension are located at points a considerable distance apart thereby permitting very heavy pay loads with light side frame bars 20 and at the same time imposing upon said main frame about 75 percent of the whole rear end load at a point just above the crank shaft 35 and in this way permitting of a short wheel base (short turning radius) and considerable overhang of the main frame rearwardly of the third axle 51.

12. Stiffening the main frame of the vehicle in a simple manner and at the precise point where about 75 per cent of the rear end load is sustained.

Figures 8–10

This construction differs from that previously illustrated and described in that the front and rear ends of the main springs are provided with ball and socket joints 95 and 951 respectively and that lateral movement of the upper ends of each modified shackle 30b is limited. Such a lateral limitation is desirable when the character of the load and the roadway is such that the driving wheels are repeatedly subjected to such heavy side thrusts as cannot be sustained by the lateral strength of the main springs to a sufficient degree to prevent said shackles from coming in contact with the main frame bars 20. In the construction of Figs. 8 and 9 this lateral limitation is obtained by securing to each main frame bar 20 a vertical longitudinal guide plate 96, the same being secured in place by bolts 97 and 98 Journaled suitably in the upper end of each modified shackle 30b is a pair of antifriction rollers 100, the same being at all times in close contact with the outer flat face of their companion guide plate 96. When this construction is employed, the ball and socket connection between the lower end of the shackle 30b and the front end of the equalizing member 32 may be eliminated.

Such a construction constitutes a refinement of the invention not ordinarily required of commercial installations. A very satisfactory "set up" is to employ this construction minus this lateral limitation feature and also minus the rear ball and socket joint 951,—such a construction then only differing from the construction of Figs. 1–7 in the provision of the front ball and socket joint 95. Theoretically both ball and sockets 95 and 951 (and particularly the former) permit of a freer spring action, but usually the main spring 22 is sufficiently long to permit of the necessary twisting movement without danger of fracture and without materially stiffening the resilient action as a whole. It is to be understood that all of the matters just discussed are only of significance when one end of one of the axles moves vertically up or down relatively to the other end of said axle.

It will be noticed that in its normal position, the ball member 101 of the ball and socket joint 951 bears with its outer side only against the adjacent vertical face of the bifurcated shackle 30b while a clearance is provided between the inner side of said ball member 101 and the adjacent vertical face of said shackle 30a. By this construction the rear end of the main spring 22 is free to slide inwardly when it moves up or down relatively to the rear end of the companion main spring 22. Such an arrangement is of value when the tilting occurs in either the main axle 24 or the third axle 51, inasmuch as the tilt of either one of these axles alters the relative disposition of the rear ends of the main springs 22. Such a lateral sliding is also provided at the front ball and socket joint 95 of each main spring, as shown in Fig. 8b which is analogous to that shown in Fig. 1a.

Figure 10 illustrates a less expensive method of limiting lateral movement of the upper end of the shackle 30. In this case the rollers 100 of Figs. 8 and 9 are dispensed with and are replaced by a pivot pin 102 having a wide hardened head 103 which is normally spaced a short distance away from the guide plate 961. Where such a clearance is provided, the provision of a lateral sliding movement of the main spring 22 relatively to this shackle 30 (such as shown in Figs. 9 and 1a) may be eliminated, the whole upper end of the shackle being free to swing inwardly in this particular case. To permit of the greatest possible lateral movement of the hardened pivot head 103 relatively to its guide plate 961, the lower end of the latter may be curved inwardly as shown in Fig. 10, so that a very considerable lateral movement of said pivot head 103 is rendered possible when in various lower positions, without altering the distance of the main spring 22 from the adjacent guide frame bar 20.

Figures 11 and 12

Here is disclosed a "nonbottoming" three-axle spring suspension totally devoid of main springs and hence having no side sway except that inevitably due to the pneumatic tires. In this construction each main spring 22 is replaced by an equalizing member 221, the distance between the pivot 211 and the driving axle 241 being substantially reduced (as compared to the construction of Fig. 1) so as to obtain a greater resistance to lateral movement of said driving axle 241 and also because, in this case, resilience of the driving and third axles is not a function of the distance from said pivot 211 to the driving axle 241, as in Fig. 1. One very important advantage of this construction is that this driving axle 241 may be arranged precisely as is the third axle 51 (see Fig. 6) i. e. with a ball and socket joint 106 (see Fig. 10) between each end of said driving axle 241 and its supporting member, which in this case consists of the secondary equalizing member 221. Similarly also to the third axle 51, this driving axle 211 at each end is slidable relatively to the ball member 107 of the ball and socket 106, while outward movement of said axle relatively to said ball member 107 is limited by a suitable stop collar 108 which, in the normal position of the spring suspension, bears against the inner face of its companion ball member 107. Thus both axles in this construction are absolutely free to tilt to any angle without any binding action.

Where maximum antiside-sway qualities are desired the crank shaft 35 is constructed in the manner of Figs. 7 and 2, i. e. with the two crank shaft sections rigidly locked together. When however this nonside-sway feature is not so important, and it is desired to provide softer riding qualities, then the two crank shaft sections are connected together in the manner shown in Fig. 13, i. e. with the coupling or collar 741 secured rigidly by a key 110 or otherwise to the one of said crank shaft sections, while free to rotate on the other crank shaft section. Endwise displacement of the two crank shaft sections relatively to each other may be prevented in any suitable manner, for instance, by having an annular retaining groove 111 formed at the inner end of the particular crank shaft section which rotates within the collar 741, said groove being engaged by an annular inwardly extending retaining flange 112.

Figure 13

In this three axle spring suspension the two axles 24e and 51e are arranged with ball and socket joints and in such manner as to provide for lateral slipping (in the manner of Fig. 6) in a symmetrical, equalizing member 32e. The central part of the latter is fulcrumed on the crank arm 342, the vertical movement of which is one half of the vertical movement of the axles as the vehicle wheels 29 and 54 move over an obstruction or drop into a depression. The crank shaft 352 is suitably journaled at its opposite ends in the central parts of a pair of semi-elliptic main springs 119 which are slidably supported at opposite ends in front and rear slide boxes 116, 117 respectively. Longitudinal shifting of said crank shaft 352 is prevented by a pair of suitable radius arms 118 which are pivoted at their front ends, in the usual and well known manner, to the vehicle frame 20. To clear these radius arms the front axle 24e is dropped at 120. Rotation of the crank shaft 352 is resiliently restrained by a helical secondary spring 44 in a manner similar to that previously described. The crank shaft 352 consists of the usual pair of crank shaft sections which may either be rigidly connected together or rotatably connected together, in which latter case each section is provided with an individual secondary spring 44.

Figure 14

This construction is analogous to that of Fig. 13 except that the modified crank shaft 353 is journaled directly in the main frame 20, while the walking beams or equalizing members 322 are journaled on a plain cross shaft 121 which is clamped adjacent its opposite ends by U bolts 122 to the central or thick parts of a pair of semi-elliptic, main springs 123. Each end of the crank shaft 353 is provided with a crank arm 343 upon which is journaled an antifriction roller 124. The latter bears downwardly upon the upper rear face of its companion main spring 123. Any upward pressure at one end or the other of the plain cross shaft 121 causes the companion roller 124 to swing upwardly and forwardly. This movement is sinusoidal as to its effects upon both vertical and horizontal components. The sinusoidal effect upon vertical movement has been already described. The sinusoidal horizontal movement of said roller 124 causes an accelerated decrease in the effective length of its main spring 123 as said roller moves upwardly and forwardly. Thus the "nonbottoming" feature of the invention is obtained not only by the crank shaft 353 per se but also by the acceleratedly decreased effective length of its companion main spring 123. Rotation of said crank shaft 353 is resiliently resisted by a helical secondary spring 44 in a manner similar to that previously described in the other constructions. It is obvious that this advantage as to effective main spring length may be obtained in a two axle vehicle by mounting the wheels in such case directly on the plain cross shaft 121 in which case the equalizing members 322 and extra axle and wheels would be eliminated.

Figure 15

In this three axle modification of the invention the two axles 125 and 126 are bolted to the central part of companion semi-elliptic springs 127 and 128 by U bolts 130. Said semi-elliptic springs are pivoted at 131, 132 respectively to the main frame 20. The opposite end of each of said semi-elliptic springs is pivoted at 133, 134 respectively to the upper end of a companion shackle 135, 136 respectively. The lower ends of said shackles are pivoted at 137, 138 to a whipple-tree 140, the central part of which is journaled on the crank arm 34 of the crank shaft 35. The latter is preferably journaled on the main chassis frame 20 in the manner of Fig. 7, and similarly provided with means for resiliently restraining its rotary movement. Ths spring suspension not only provides the "nonbottoming" and also the nonside-sway action for both of the axles 125, 126, but, in addition, compensation between the wheels on each side of the vehicle is obtained by the action of the companion whipple tree 140, which keeps each side of the vehicle "on an even keel" when a wheel on the one side of the vehicle is moved vertically by transferring the load (either positive or negative) to the companion wheel on the same side of the vehicle. To phrase the action differently, it may be said that when one wheel is moved vertically, such a movement is not opposed by the inertia of the vehicle, the change in pressure being shifted instead to the other wheel on the same side of the vehicle.

Figures 16 and 17

In this modification of the two axle vehicle, the axle 125 is rigidly bolted by U bolts 130 to the central part of a semi-elliptic main spring 141, the front end of which is pivoted at 131 to the main frame of the vehicle. The rear end of said main spring 141 is connected by a ball and socket joint 142 with the upper end of a link 143 (see Fig. 17), the lower end of which is connected by a ball and socket joint 144 with the crank arm 34h of a crank shaft 35h. Said crank shaft is journaled at opposite ends at 145 in a balancing lever 146, the central part of which is pivoted at 147 on the main frame 20 of the chassis. As in the constructions heretofore described the crank shaft 35h is resiliently restrained against rotation by a secondary spring 44, the rear end of which is pivoted to the upper end of an upstanding lever 47 secured at its hub to said crank shaft. By this manner of construction the axle 125 is connected to the main frame 20 of the chassis by a three point suspension, thereby eliminating distortion of said frame. In addition to this the traction of the ground wheels is rendered more positive by reason of the balancing lever 146, which causes the downward thrust of said ground wheels to be maintained substantially equal to each other under all conditions of roadway and speed of travel.

General

It cannot broadly be said that any particular one of the foregoing modifications of the invention is superior to all the others. What can however be asserted positively is that for any given combination of operating conditions, there is one form of spring suspension which is the best for such conditions whereas, under a different combination of operating conditions, another form of spring suspension may be the best. In general it may be said that for ordinary passenger carrying vehicles the two axle chassis is the better, while for trucks, busses etc. the three axle chassis is preferable. It should also be borne in mind that the design of the spring suspension at the one end of any vehicle is vitally influenced by the type of spring suspension used at the other end of said vehicle.

In all of the side elevations which illustrate the different modifications of the invention it has been assumed that the front end of the vehicle is positioned to the left. It is obvious however that such an arrangement, even though preferable in most cases, is optional only, it being quite practical to use such embodiments of the invention with the front end of the vehicle positioned to the right. It is also to be understood that whether any certain axle is to be either a driving, a mere supporting, or a front axle is a matter which depends upon the exact conditions to be met, and no special effort has been exerted in this patent application to indicate how the design is affected by the character of the axle, such matters being of common knowledge in the art. A similar condition of affairs is presented in regard to effect upon the design when the wheels of any certain axle are to be provided with either mechanical or hydraulic brakes which require positive means of preventing shaft rotation and also bring in other factors that are beyond the scope of the present invention.

I claim as my invention:

1. A vehicle spring suspension associated with the frame and wheel of a vehicle and comprising a crank shaft having a crank arm; a bearing supporting said crank shaft and connected with the vehicle frame; means for resiliently restraining rotation of said crank shaft; and an equalizing member fulcrumed intermediately of its ends on said crank arm and connected at one end with aforesaid wheel, and means connecting the other end of said equalizing member with said frame.

2. A vehicle spring suspension associated with the frame and wheels of a vehicle and comprising: a crank shaft having a crank arm at each end; a bearing supporting said crank shaft and connected with the vehicle frame; means for resiliently restraining rotation of said crank shaft; an equalizing member fulcrumed intermediately of its ends on each of said crank arms and connected at one end with one of aforesaid wheels, and means connecting the other end of said equalizing member with said frame.

3. A vehicle spring suspension associated with the frame and wheel of a vehicle and comprising: a crank shaft having a crank arm; a bearing supporting said crank shaft and connected with the vehicle frame; means for resiliently restraining rotation of said crank shaft; an equalizing member fulcrumed intermediately of its ends on said crank arm and connected at one end with aforesaid wheel; and resilient means connecting the other end of said equalizing member with said frame.

4. A vehicle spring suspension associated with the frame and wheels of a vehicle and comprising: a crank shaft having a crank arm at each end; a bearing supporting said crank shaft and connected with the vehicle frame; means for resiliently restraining rotation of said crank shaft; an equalizing member fulcrumed intermediately of its ends on each of said crank arms and connected at one end with one of aforesaid wheels; and resilient means connecting the other end of said equalizing member with said frame.

5. A vehicle spring suspension associated with the frame and wheels of a vehicle and comprising: a crank shaft having a crank arm; a bearing supporting said crank shaft and connected with the vehicle frame; means for resiliently restraining rotation of said crank shaft; and an equalizing member fulcrumed intermediately of its ends on said crank arm and connected at one of its ends with one of said vehicle wheels; and means connecting the other end of said equalizing member with another of said vehicle wheels.

6. A vehicle spring suspension associated with the frame and wheels of a vehicle and comprising: a crank shaft having a crank arm at each end; a bearing supporting said crank shaft and connected with the vehicle frame; means for resiliently restraining rotation of said crank shaft; and an equalizing member fulcrumed intermediately of its ends on each of said crank arms and connected at one of its ends with one of said vehicle wheels; and means connecting the other end of said equalizing member with another of said vehicle wheels.

7. A vehicle spring suspension associated with the frame and wheel of a vehicle and comprising: a crank shaft having a crank arm; a bearing supporting said crank shaft and connected with the vehicle frame; means for resiliently restraining rotation of said crank shaft; an equalizing member fulcrumed intermediately of its ends on said crank arm and connected at one end with aforesaid wheel; resilient means connecting the other end of said equalizing member and the frame; and means for altering the torque pressure exerted upon said equalizing member by said resilient connecting means.

8. A vehicle spring suspension associated with the frame and wheel of a vehicle and comprising: a crank shaft having a crank arm; a bearing supporting said crank shaft and connected with the vehicle frame; means for resiliently restraining rotation of said crank shaft; an equalizing member fulcrumed intermediately of its ends on said crank arm and connected at one end with aforesaid wheel; a link pivoted at one end to the other end of said equalizing member; means connecting the other end of said link with the frame; and means for altering the position of the pivot of said link relatively to said equalizing member.

9. A vehicle spring suspension associated with the frame and wheel of a vehicle and comprising: a crank shaft having a crank arm, a bearing supporting said crank shaft and connected with the vehicle frame; means for resiliently restraining rotation of said crank shaft; an equalizing member fulcrumed intermediately of its ends on said crank arm and connected at one end with aforesaid wheel; a link pivoted to the other end of said equalizing member; and a spring connecting said link and the vehicle frame.

10. A vehicle spring suspension associated with the frame and wheel of a vehicle and comprising: a crank shaft having a crank arm, a bearing supporting said crank shaft and connected with the vehicle frame; means for resiliently restraining rotation of said crank shaft; an equalizing member fulcrumed intermediately of its ends on said crank arm and connected at one end with aforesaid wheel; a link pivoted to the other end of said equalizing member; a spring connecting said link and the vehicle frame; and means for altering the location of the pivot between said link and said equalizing member.

11. A vehicle spring suspension associated with the frame and wheels of a vehicle and comprising: a crank shaft having a crank arm; a bearing supporting said crank shaft and connected with the vehicle frame; means for resiliently restraining rotation of said crank shaft; an equalizing member fulcrumed intermediately of its ends on said crank arm and connected at one end with one of aforesaid wheels; and a main spring operatively connected to the other end of said equalizing member and to the vehicle frame, said main spring being also connected with the other of aforesaid wheels.

12. A vehicle spring suspension associated with the frame and wheels of a vehicle and comprising: a crank shaft having a crank arm at each end; a bearing supporting said crank shaft and connected with the vehicle frame; means for resiliently restraining rotation of said crank shaft; an equalizing member fulcrumed intermediately of its length on each of said crank arms and connected at one of its ends with one of aforesaid wheels; and a main spring operatively connecting the other end of each of said equalizing members with the vehicle frame, said main spring being also connected to another of aforesaid wheels.

13. A vehicle spring suspension associated with the frame and wheels of a vehicle and comprising: a crank shaft having a crank arm; a bearing supporting said crank shaft and connected with the vehicle frame; means for resiliently restraining rotation of said crank shaft; an equalizing member fulcrumed intermediately of its length on said crank arm and connected at one end with one of aforesaid wheels; a semi-elliptic spring operatively connected at its extremities to the other end of said equalizing member and to the vehicle frame and connected intermediately of its ends to the other of said wheels.

14. A vehicle spring suspension associated with the frame and wheels of a vehicle and comprising: a crank shaft having a crank arm at each end; a bearing supporting said crank shaft and connected with the vehicle frame; means for resiliently restraining rotation of said crank shaft; an equalizing member fulcrumed intermediately of its ends on each of said crank arms and means resiliently connecting its one end with the vehicle frame; and an axle provided with aforesaid wheels and connected by a ball and socket joint with the other end of each of said equalizing members.

15. A vehicle spring suspension associated with the frame and wheel of a vehicle and comprising: a crank shaft having a crank arm; a bearing supporting said crank shaft and connected with the vehicle frame; means for resiliently restraining rotation of said crank shaft; an equalizing member fulcrumed intermediately of its ends on said crank arm and connected at one end with aforesaid wheel; and a main spring operatively connected through the intermediary of a ball and socket joint with the other end of said equalizing member and also connected to said frame.

16. A vehicle spring suspension associated with the frame and wheel of a vehicle and comprising: a crank shaft having a crank arm; a bearing supporting said crank shaft and connected with the vehicle frame; means for resiliently restraining rotation of said crank shaft; an equalizing member fulcrumed intermediately of its ends on said crank arm and connected at one end with aforesaid wheel; and a main spring operatively connected through the intermediary of a ball and socket joint with the other end of said equalizing member and also connected to said frame; the joint between said main spring and said equalizing member being adjustable relatively to its distance from said crank arm.

17. A vehicle spring suspension associated with the frame and axle and wheel of a vehicle: a transverse shaft; a bearing supporting said shaft and connected with the vehicle frame; an equalizing member fulcrumed on said shaft and connected at one end to aforesaid axle; means connecting the other end of said equalizing member to the frame; and a torque arm journaled on said shaft and connected by a ball and socket joint with said axle.

18. A vehicle spring suspension associated with the frame and axle and wheel of a vehicle; a transverse shaft; a bearing supporting said shaft and connected with the vehicle frame; an equalizing member fulcrumed on said shaft; means connecting one end of said equalizing member with aforesaid axle; means connecting the other end of said equalizing member with the frame; a torque arm journaled on said shaft; and a swinging bracket pivotally connected with said axle and connected by a ball and socket joint with said torque arm.

19. A vehicle spring suspension associated with the frame and wheel of a vehicle and comprising: a crank shaft having a crank arm; a bearing supporting said crank shaft and connected with said vehicle frame; an equalizing member journaled on said crank arm and connected at one end with aforesaid wheel; and means for restraining movement of the other end of said equalizing lever relatively to the vehicle frame.

20. A vehicle spring suspension associated with the frame and wheel of a vehicle and comprising: a crank shaft having a crank arm; a bearing supporting said crank shaft and connected with said vehicle frame; an equalizing member fulcrumed on said crank arm and connected at one point with said wheel; and means connecting another point of said equalizing member and the vehicle frame.

21. A vehicle spring suspension associated with the frame and wheels of a vehicle and comprising: a crank shaft having a crank arm at each end; a bearing supporting said crank shaft and connected with the vehicle frame; an equalizing member journaled on each of said crank arms and connected at one point with one of said wheels; and means connecting another point of said equalizing member and the vehicle frame.

22. A vehicle spring suspension comprising a frame; a main spring connected at one end to said frame and vertically movable at its other end relatively to said frame; means connected with said frame for resisting the vertical movement of said other end of said main spring; a guide plate secured to said frame and arranged to limit lateral deflection of said other end of said main spring; and a wheel connected with said main spring.

23. A vehicle spring suspension comprising a frame; a main spring connected at one end to said frame; an equalizing member operatively connected with the other end of said main spring; a guide plate secured to said frame and arranged to limit lateral deflection of said other end of said main spring; a bearing connected with said frame; a crank shaft having a crank arm, the latter constituting the fulcrum of said equalizing member; and a wheel connected with said equalizing member.

24. A vehicle spring suspension associated with the frame and wheels of a vehicle and comprising: a shaft; means connecting said shaft with the frame; an equalizing member journaled on said shaft and connected at one point with one of the vehicle wheels; a sliding head adjustably arranged at another point of said equalizing member; and means connected through the intermediary of a ball and socket joint with said sliding head and also connected with the frame and provided with an axle, the latter having journaled thereon another of said vehicle wheels.

ALBERT F. HICKMAN.